United States Patent [19]
Kleine

[11] Patent Number: 4,531,596
[45] Date of Patent: Jul. 30, 1985

[54] TOOL FOR BORING AN ENLARGED PORTION WITHIN THE INTERIOR OF A HOLE AND A TILTABLE TOOL FOR COMPLETING THAT TOOL

[75] Inventor: Werner Kleine, Achim-Uesen, Fed. Rep. of Germany

[73] Assignee: Gebruder Heller Dinklage GmbH Werkzeugfabrik, Fed. Rep. of Germany

[21] Appl. No.: 545,192

[22] Filed: Oct. 25, 1983

[30] Foreign Application Priority Data

Nov. 5, 1982 [DE] Fed. Rep. of Germany ....... 3240859

[51] Int. Cl.³ .............................................. E21B 10/32
[52] U.S. Cl. ...................................... 175/384; 175/262
[58] Field of Search ................. 175/51, 257, 258, 260, 175/262, 264, 284, 319, 320, 325, 381, 382, 384, 77, 78, 265, 286

[56] References Cited

U.S. PATENT DOCUMENTS

| | | | |
|---|---|---|---|
| 402,394 | 4/1889 | Brown | 175/384 |
| 833,240 | 10/1906 | Potter . | |
| 1,832,129 | 11/1931 | Knaur | 175/260 |
| 4,169,510 | 10/1979 | Meigs | 175/285 |

FOREIGN PATENT DOCUMENTS

| | | |
|---|---|---|
| 2331467 | 1/1975 | Fed. Rep. of Germany . |
| 2547412 | 11/1976 | Fed. Rep. of Germany . |
| 8032632 | 10/1982 | Fed. Rep. of Germany . |
| 0382954 | 11/1932 | United Kingdom . |

Primary Examiner—Stephen J. Novosad
Assistant Examiner—Bruce M. Kisliuk
Attorney, Agent, or Firm—Hopgood, Calimafde, Kalil, Blaustein & Judlowe

[57] ABSTRACT

An improved boring tool comprising a longitudinal groove in its shaft and a two-armed tool within the groove is provided for boring an enlargement within a hole. The two-armed tool has a rear actuating arm and a forward cutting arm and is tiltably supported in the groove for tilting between an ineffective position, in which its actuating arm extends out of the groove for cooperating with the edge of the outer end of the hole, and effective positions in which the cutting arm reaches out of the groove for cutting the enlargement into the wall of the hole when the edge of the open end of the hole forces the actuating arm into the groove.

16 Claims, 11 Drawing Figures

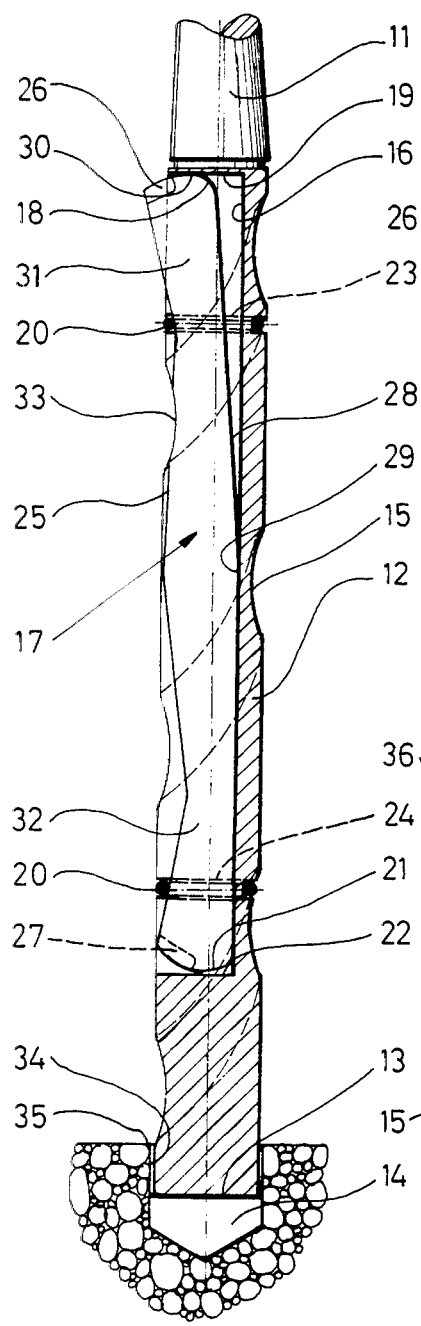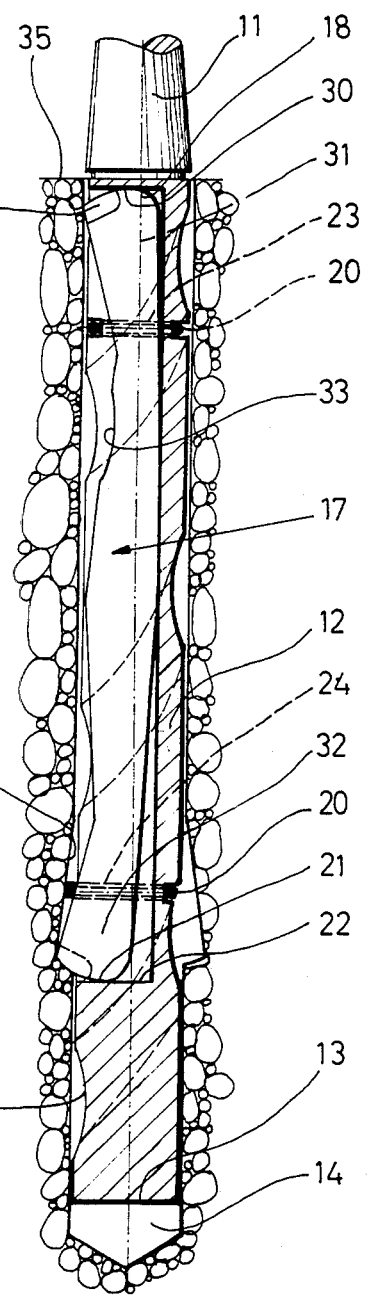

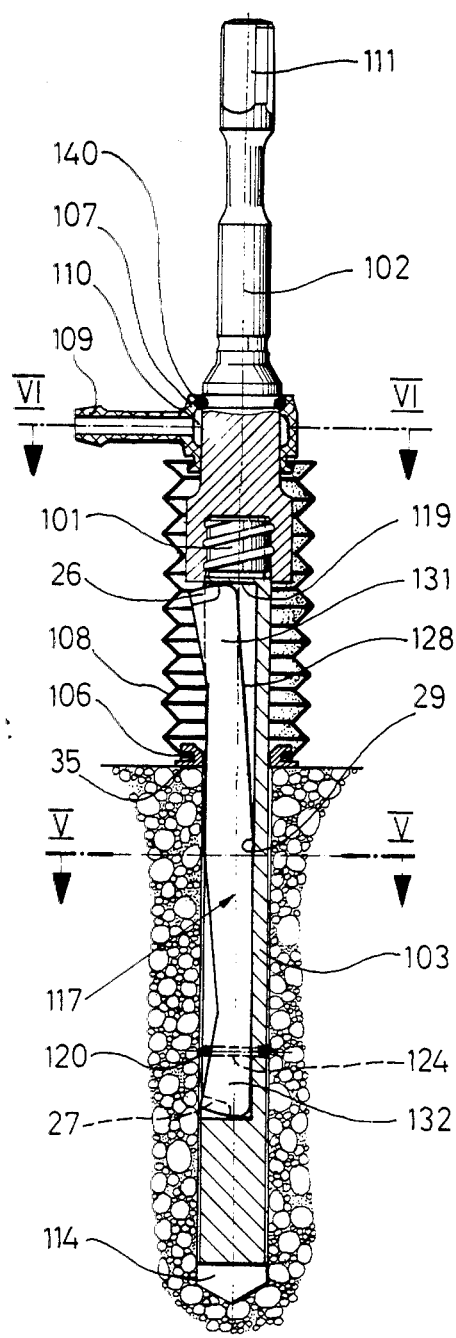
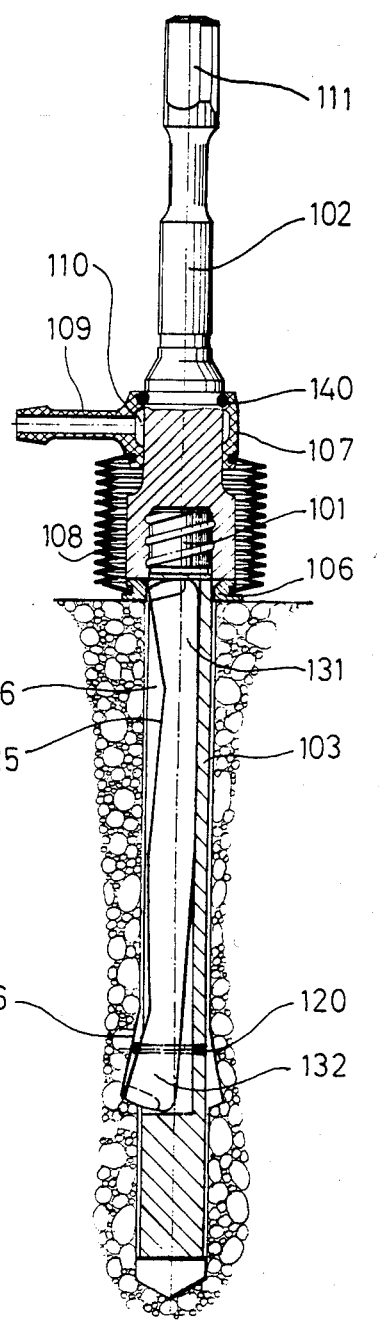

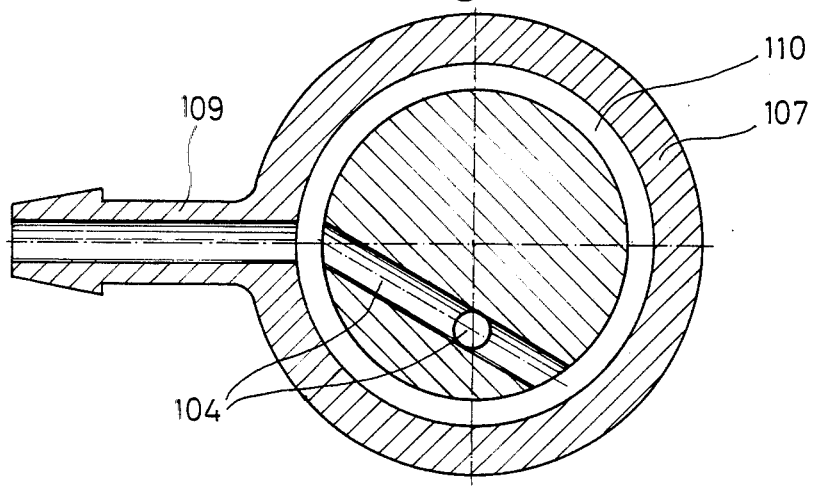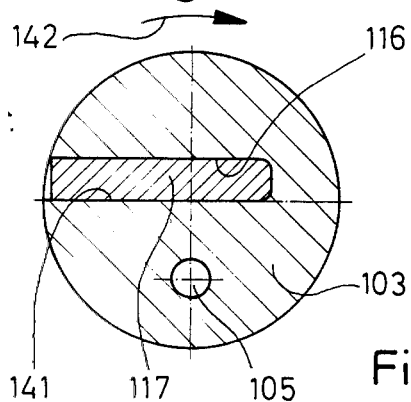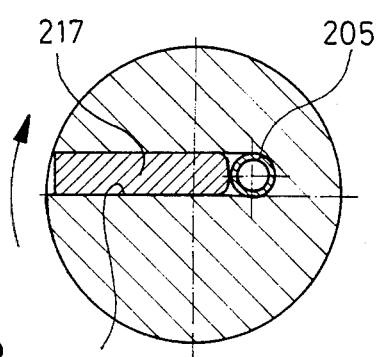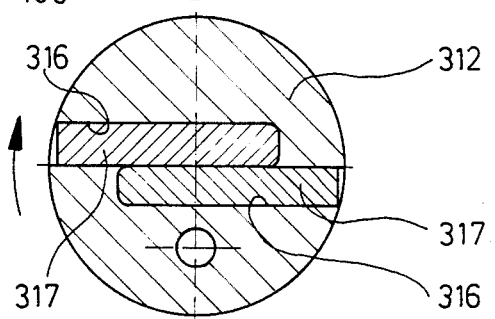

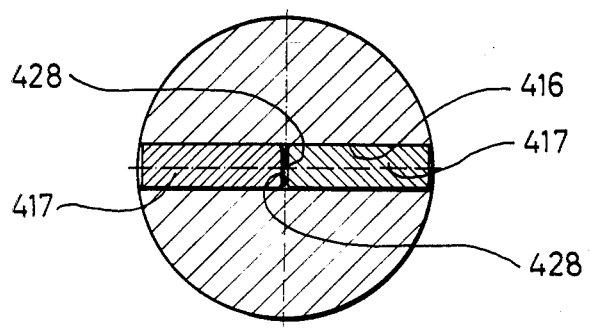
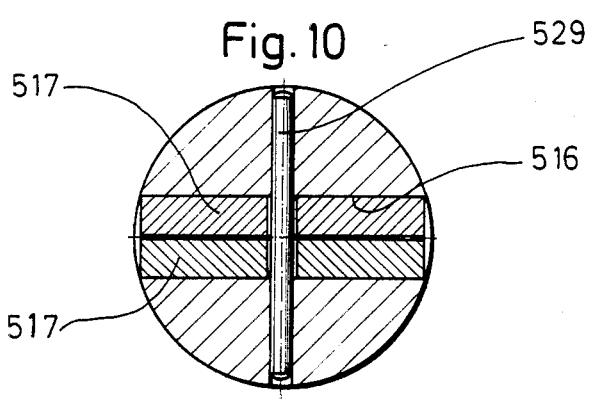
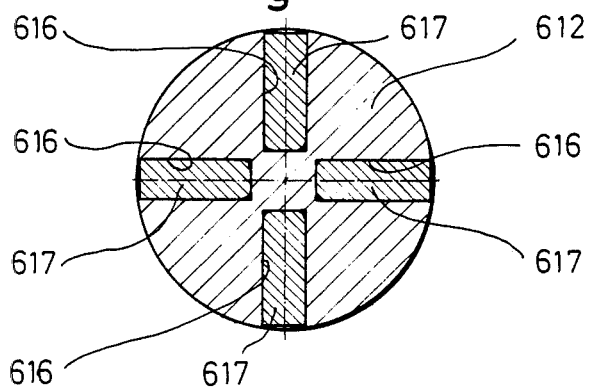

TOOL FOR BORING AN ENLARGED PORTION WITHIN THE INTERIOR OF A HOLE AND A TILTABLE TOOL FOR COMPLETING THAT TOOL

BACKGROUND OF THE INVENTION

The invention relates to a new and useful improvement of a tool for boring an enlarged portion within the interior of a hole especially in a rock, by simultaneously drilling and boring the hole or by boring a hole which already has been drilled.

The invention relates further to a tiltable tool for boring the enlarged portion of a hole which is intended for the insertion within a groove of the shaft of the above mentioned boring tool to complete it.

SUMMARY OF THE INVENTION

One object of the invention is a boring tool for boring an enlarged portion within the interior of a bore hole having a groove in the shaft for a tiltable tool which is swivable or tiltable from an ineffective position into effective positions. That tiltable tool having a cutting arm for cutting the enlarged portion of the bore hole when the tiltable tool is in its effective position.

An other object of the invention is a boring tool for boring an enlarged portion within the interior of a bore hole and for simultanuously drilling said bore hole.

One further object of the invention is a boring tool for the manufacture of an enlarged portion within the interior of a bore hole, which requires a minimum of parts for the actuation of the tiltable tool, thus simplifying the construction of the tool and also any exchange of the tiltable tool.

Another object of the invention is to provide a tiltable tool having an actuating arm for cooperating with the open end of the hole to move or tilt the tiltable tool from its ineffective position into effective positions.

Yet another object of the invention is the solution of the problem of preventing a weakening of the shaft of the boring tool, which has a groove for containing the tiltable tool, by any additional cut-outs for the actuation and, if possible also for the support of the tiltable tool.

These problems are solved in that the tiltable tool is shaped in such a manner that the actuating arm projects outwards from the groove when the tiltable tool is in an ineffective position, for control by means of the edge of the open end of the bore hole. Thus it is achieved in a simple fashion that the actuating arm is pressed into the groove by the edge of the open end of the hole, and the cutting arm, in turn, is pressed out of the groove, as soon as the boring tool has penetrated into the bore hole up to a depth, in which the enlarged section is required. No further parts are, therefore, required for the controlling effect of the open end of the bore hole on the actuating arm of the tiltable tool. Apart from the groove for the tiltable tool no further slots that might weaken the shaft of the boring tool are required for tilting the tiltable tool into its effective positions. The tiltable tool can, for this purpose, be mounted by a conventional manner on a pivot pin. In a preferred embodiment of this invention a means can be provided for producing an elastic-yielding retraction force which keeps the cutting arm in its ineffective position.

Drilling and boring tools which are fitted to impact drills are subject to impact loads during the boring operation. As soon as the cutting arm of the tiltable tool emerges from the groove of the shaft, these impact loads are also transmitted to the tiltable tool via the wall of the bore hole, whereby the pivot pin of the tiltable tool is then subjected to impact loads. Hereby the life time of such a tool is substantially reduced. Also the shaft is weakened by the holes for the pin within the shaft.

According to a preferred embodiment of this invention it is possible to avoid the use of this pivot pin completely, namely if the inner edge of the tiltable tool that faces the bottom of the groove together with the groove bottom form a bearing by the inner edge and/or the bottom of the groove being shaped in a manner that allows a tilting or swiveling movement of the tiltable tool. This will then enable the tiltable tool to be loosely positioned within the groove. Thus the most essential wearing part, namely the tiltable tool, can be easily exchanged by hand without the use of any auxiliary tools.

In cases where the boring tool according to this invention is to be used in impact drilling machines or similar equipment, the preferred embodiment can provide for a close contact between at least a portion of the rear end edge of the tiltable tool for at least all effective positions of the same with the rear end of the groove for the purpose of transmission of the impact loads.

With a boring tool according to this invention, in which the actuating arm cooperates directly with the open end of the bore hole, there is always the danger that, when the rock in which the hole is being drilled is brittle, then the open end of the bore hole could be damaged by the actuating arm projecting outwards from the groove. In order to prevent this an especially preferred embodiment of this invention has an axially-adjustable abutment ring mounted on the shaft which, on entry of the shaft into the bore hole, is pushed by means of its support on the edge of the open end of the bore hole from a forward resting position into rear working positions, where it tilts the actuating arm of the tiltable tool into the groove and, in turn, the cutting arm into its effective positions.

This invention relates also to a tiltable tool suitable for mounting into the groove of a boring tool in accordance with this invention. The tiltable tool in accordance with this invention is particularly characterized by its shape of a long plate which has a cutting edge at least at one end besides its frontal longitudinal edge and the centre line which extends over its entire length, is at least at the end opposite to the cutting edge, viewed from the frontal longitudinal edge, bent in a concave fashion.

With the above and other objects in view that may become apparent hereinafter, the nature of the invention will be more clearly understood by reference to the attached drawings, the following detailed description thereof and the appended claimed subject matter, wherein FIGS. 1 and 2 are sectional views taken along the axis of a first embodiment of a boring tool according to this invention, wherein the cutting arm is shown in its ineffective and effective position, resp.;

FIGS. 3 and 4 are sectional views of a second embodiment similar to FIGS. 1 and 2;

FIGS. 5 and 6 are sectional views taken along lines V—V and VI—VI, resp., of FIG. 3, enlarged;

FIGS. 7 to 11 are sectional views similar to FIG. 5 of five further embodiments.

The boring tool shown in FIGS. 1 and 2 for the boring of an enlargement inside of a bore hole comprises a shank 11 and a shaft 12, which form a common piece. At the forward end of the shaft there is a slot 13 with a cutting tool 14 for initial drilling. Furthermore, shaft 12 has a helical material removal groove 15 around its circumference for the waste material generated by the drilling and boring operation.

The shaft contains a groove 16 which extends over a considerable portion of its length for a tiltable tool indicated in its entirety as 17, whose length corresponds approximately to the length of groove 16, so that its rear end 18 touches the rear end 19 of groove 16 and its forward end 21 the forward end 22 of groove 16, with clearance. To prevent the tiltable tool 17 from falling out of groove 16, circular slots 23 and 24 are provided within shaft 12 in the area of the forward and rear ends of the tiltable tool, resp., each of which houses an O-ring, which holds the tiltable tool in position within the groove. The groove 16 is so arranged, as this is shown in FIG. 5 in connection with the description of the second embodiment, that that side wall of the groove (in FIGS. 1 and 2 facing the viewer), the outer edge of which trails groove 16 during the boring operation, is in a diametrical plane of shaft 12.

The tiltable tool 17 is a long plate which is axially symmetric relative to its central transverse axis which is parallel to the broadsides of the plate, i.e. approximately horizontal and in parallel to the plane of the drawings as shown in FIGS. 1 and 2, and provided with cutting tools 26 and 27 at both ends 18 and 21, resp., alongside its longitudinal edge 25 which is facing the opening of groove 16. The cutting tools being so arranged that the cutting edge of cutting tool 27 at the front end 21 of the tiltable tool 17 is at the leading broadside of the tiltable tool 17. In the presentation as shown in FIGS. 1 and 2, there is, therefore, cutting tool 27 on the broadside opposed to the viewer and cutting tool 26 on the broadside of the tiltable tool 17 facing the viewer, so that, if the tiltable tool is rotated through 180° around its central transversal axis, appearing approximately horizontal in FIGS. 1 and 2, cutting tool 26 will appear in the same position as cutting tool 27.

The second longitudinal edge 28 of the tiltable tool 17 facing the bottom of groove 16 is bent in a convex fashion around a support point 29, so that this support point together with the straight bottom of groove 16 forms a bearing for the tiltable tool 17 and subdivides the latter into an actuating arm 31 and a cutting arm 32. Around the bearing formed by the support point 29 together with the straight bottom of groove 16, the tiltable tool can be rotated from its ineffective position as shown in FIG. 1, when the actuating arm 31 projects outwards from groove 16, into its effective position as shown in FIG. 2, when the cutting arm 32 projects outwards from groove 16. The circular slots 23 and 24 are arranged for this purpose in such a manner, that O-rings 20 in the ineffective positions as shown in FIG. 1 touch without pressure the external longitudinal edge 25 of the tiltable tool, so that, on tilting into the effective position the forward O-ring 20 is tensioned and thereby exerts a retracting force for reversing the tiltable tool 17 into its ineffective position.

Both ends 18 and 21 of the tilting tool are rounded off in a convex manner, and the cutting tools 26 and 27 are arranged in such a way, that the cutting tool that is near the rear end at a time (cutting tool 26 when the tiltable tool 17 is positioned as shown in FIGS. 1 and 2) always keeps, in all tilting positions of the tiltable tool 17, a distance from the point 30 of the rear edge, where the tiltable tool 17 touches groove 16 at its rear end 19.

In order to avoid any interference with the removal of waste material through the material removal groove 15 by the tiltable tool in any of its positions, the latter is provided with cut-outs 33 at its external longitudinal edge 25. Thus a projection of the tiltable tool at any of its positions into the material removal groove is prevented.

During a boring operation with the boring tool as shown in FIGS. 1 and 2, first of all a cylindrical hole is produced by means of the cutting tool 14. Hereby the tiltable tool is in its ineffective position as shown in FIG. 1, where the actuating arm 31 projects outwards from groove 16. As soon, however, as the boring tool has penetrated far enough through the rock to be drilled for the rear end of the longitudinal edge 25 of the actuating arm 31, which projects outwards from groove 16, to touch the rock surface at the open end of the hole 35, then, on further penetration by the boring tool into the rock, the tiltable tool 17 is tilted from its ineffective position as shown in FIG. 1 into its effective position, where the forward end of the cutting tool 32 of the tiltable tool 17 with cutting tool 27 projects outwards from groove 16 and thereby an enlarged portion 36 is created within the cylindrical hole with increasing penetration of the boring tool into the rock.

By having a contact between the rear end of the tiltable tool 17 and the rear end 19 of the groove 16 at point 30, which is a distance removed from the cutting tool 26, damage to the cutting tool 26 or its dismounting from the tiltable tool is prevented when the boring tool is used with an impact drill and impact loads are transmitted from the bore hole wall to the tiltable tool 17.

On retracting the boring tool from the bore hole 13 the tiltable tool is tilted back into its ineffective position by means of the force of O-ring 20, as soon as the actuating arm 31 emerges from the bore hole. After wear the tiltable tool 17 can be easily tipped out of groove 16 after prior removal of the O-ring 20, which is possible at any time without the use of any auxiliary tools.

For the presentation of the second preferred embodiment in FIGS. 3 to 6, all those parts which correspond with the embodiment according to FIGS. 1 and 2 are indicated by reference numbers which are increased by 100, so that it is possible by the use of these reference numbers to refer to the description of the embodiment according to FIGS. 1 and 2.

The second embodiment is distinguished from the first primarily in that it consists of two connected parts, with the illustrated example by means of a threaded connection 101, namely mounting end 102 with shank 111 and the shaft 103. Shaft 103 and mounting end 102 have suction channels 104 and 105, resp., which, when the parts are screwed together, are communicating with each other for the purpose of the removal of waste material. Shaft 103 has, therefore, no groove around its external surface corresponding to the material removal groove 15 of the first embodiment. The tiltable tool 117 corresponds essentially to the tiltable tool 17 of the first embodiment, except that since there is no removal groove, there is no need for the cut-outs 33 at the longitudinal edge 125.

A substantial difference between the second embodiment and the first consists in that the second embodiment comprises an abutment ring 106 within the region of the groove 116 for the cooperation with the open end 35 of the bore hole 35. The abutment ring 106 is loosely mounted on the shaft 103, so that it can be moved axially along the shaft 103 and the latter can rotate relative to the abutment ring 106. This abutment ring 106 is connected to a connection sleeve 107 by means of bellows 108 which keep the abutment ring 106 at a distance from the connection sleeve 107 in a resilient-flexible manner, so that the abutment ring 106 is kept at such a distance from the rear end of groove 116 that it does not touch the portion of the actuating arm 131 that projects outwards from groove 116. The connection sleeve 107 is free to rotate, but axially fixed and supported on the mounting end 102 and is provided with a connection nozzle 109 for a vacuum or suction line that is not shown in the drawing. Further, the connection sleeve has an internal circular groove 110 which is sealed against the atmospere by means of sealing rings 140, and it is in communication with the suction channel 104.

The cutting tool 114 at the forward end of shaft 103 is connected to shaft 103 in the known exchangeable manner and arranged in such a way, that its broadsides are in parallel to the broadsides of the tiltable tool 117.

As the abutment ring prevents a falling out of the tiltable tool 117 it replaces the upper O-ring 20 of the first embodiment. In order to prevent any falling out of the tiltable tool from groove 116 by its lower end there is provided, as before, the O-ring 120 for this lower end, which is located in a circular groove 124 of the shaft 103 and which produces the retractive force to retain the tiltable tool 117 resilient-flexibly in its ineffective position.

For boring operations with the boring tool as shown in FIGS. 3 to 6 a vacuum line is connected to the connection nozzle 109 which prevents the connection socket from being moved by the rotational motion of the mounting end 102. This has the effect, that also abutment ring 106 does not take part in this rotational motion. As soon as the bore hole 34 which is being drilled by the boring tool has reached a depth at which the abutment ring 106 touches the surface surrounding the open end of hole 35, then, on further boring the abutment ring 106 is shifted axially backwards along shaft 103 until it strikes the actuating arm 131, which projects outwards from groove 116, and pushes it into the groove and thereby simultaneously cutting arm 132 for the boring of the enlarged portion 36 outwards from groove 116. The abutment ring 106 abuts or rests hereby firmly on the surface around the open end of the hole, so that the former is protected from the action of the actuating arm. On retracting the boring tool from bore hole 34 the abutment ring 106 is pressed forwards by the spring action of bellows 108 until it has reached the position as shown in FIG. 3, in which it releases the actuating arm of the tiltable tool 117, so that the tiltable tool can be tilted back into its ineffective position by means of the retractive force of O-ring 120.

As can be seen from FIG. 5, that side wall 141 of groove 116, whose external edge trails groove 116 during rotation of the boring tool in the direction of arrow 142, i.e. during the boring operation, is in a diametrical plane of the shaft and the suction channel 105 is located in that half of shaft 103 that is not weakened by groove 116, whereby any weakening of shaft 103 by groove 116 and suction channel 106 can be kept to a minimum and an optimum of support effect is achieved for the tiltable tool 117 during the boring work for enlargement 36. In order to avoid any cracks in the bottom corners of the groove, there are radii at the bottom surface which provide for a continuous transition from the bottom wall into the side walls, as can be seen from FIG. 5.

For both of the described embodiments the tiltable tool is axially symmetric relative to its transverse axis, so that after wear of cutting tool 27 the tiltable tool can be reversed so that cutting tool 26 comes into the forward position and becomes effective for the boring of the enlarged portion. Instead of having a support point 29 on the tiltable tool 17 and 117, resp., as provided for by the two embodiments, the inner longitudinal edge 28 and 128, resp., of the tiltable tool can also be arched. Instead of a convex inner edge 28 and 128, resp., this can also be a straight inner edge, provided that the bottom of the groove is then shaped in such a way that the straight rear edge forms a tilting axis together with the bottom of the groove, around which the tiltable tool can be tilted from its ineffective into its effective position. In either case, however, the tiltable tool is so formed that its longitudinal centre line is concavely buckled or bent, when viewed from the external longitudinal edge 125.

In order to prevent the cutting tool to be shifted axially too quickly by the action of abutment ring 106 against the actuating arm 131, which could be the case in the event of the boring tool being used only for enlarging portion 36 of an already existing bore hole 34 or, in a modified embodiment it having been designed exclusively for this purpose, then a damping element can be provided for abutment ring 106 which element is not shown in the drawing and which would brake the motion of ring 106 from its forward resting position into its rear working position, for instance at least one damping cylinder, located between connection sleeve 107 and abutment ring 106.

FIGS. 7 to 11 represent further variations of the described embodiments.

With the embodiment according to FIG. 7 the suction channel is formed by means of a tube 205 which is inserted into groove 116, against which tiltable tool 217 is supported in the described manner and which forms the bearing for the tiltable tool.

With the embodiment shown by FIG. 8 there are two interconnected grooves 316 approximately arranged at two diametrically opposing sides of shaft 312 for two tiltable tools 317.

With the embodiment shown by FIG. 9 there is one diametrically through going and centrally arranged groove 416, which houses two tiltable tools 417, which together form their common tilting bearing by their inner longirudinal edges 428.

With the embodiment shown by FIG. 10 there is also a diametrically through going groove 516 which houses in parallel two tiltable tools 517 in such a manner, that they are located next to each other in a diametrical plane of shaft 512. In this case a transverse pin 529 is provided which forms the tilting or pivot axis.

With the embodiment shown by FIG. 11 the shaft 612 has four grooves 616, arranged at right angles to each other, for four tiltable tools 617.

I claim:

1. A tool for boring an enlarged portion within a hole having at least one open end surrounded by an edge, said enlarged portion being spaced from said open end, said tool comprising an elongated shaft having a leading end, a shank, and a groove which extends along a portion of said shaft and has at least one opening extending along said shaft, further comprising a tiltable tool within said groove, the tiltable tool having a cutting arm adjacent to said leading end and an actuating arm adjacent to said shank of said shaft, said tiltable tool being so formed and having a tiltable support within said groove for tilting said cutting arm from an ineffective position into effective positions so that when said cutting arm is in said ineffective position within said groove said actuating arm extends out of said opening of said groove, so that it can be actuated by said edge surrounding said open end of said hole to move said cutting arm into a cutting position for cutting said enlarged portion of said hole.

2. A tool according to claim 1 wherein said shaft has at least one cutting tool at its leading end for drilling said hole.

3. A tool according to claim 1 wherein said tiltable tool, having an inner longitudinal edge, lies loosely in said groove having a bottom with said longitudinal edge of said tiltable tool facing said bottom of said groove, said longitudinal edge and said bottom forming said tiltable support.

4. A tool according to claim 3, wherein there is provided means to hold said tiltable tool within said groove of said shaft in a manner that permits its tilting, and means to produce a retractive force which retains said cutting arm in its ineffective position.

5. A boring tool according to claim 4, wherein said shaft has a circumferentially disposed circular slot in the region of said cutting arm for an elastic-yielding ring which, by bridging said groove cooperates with an external longitudinal edge of said cutting arm in order to generate said retractive force for said tiltable tool and which also acts as said means to hold said tiltable tool within said groove.

6. A boring tool according to any one of the claims 1 to 5, wherein said tiltable tool and said groove have rear ends, and at least a portion of said rear end of said tiltable tool engages said rear end of said groove at least in all of said effective positions of said cutting arm.

7. A boring tool according to any one of the claims 1 to 5, wherein said groove is so arranged, that its central plane is in parallel and at a distance from a diametrical plane of said shaft and that said opening of said groove precedes said diametrical plane in the direction of boring rotation of said shaft.

8. A boring tool according to claim 1, wherein an axially movable abutment means is provided on said shaft which, on entry of said shaft into said bore hole abuts on said edge surrounding said open end of said hole, so that it is pushed from a forward resting position into rear working positions during the boring operation and tilts said actuating arm of said tiltable tool into said groove and thereby, in turn, said cutting arm into said effective positions.

9. A boring tool according to claim 8, wherein a retraction means is provided for holding said abutment means in said resting position.

10. A boring tool according to any one of the claims 1 to 5, 8 or 9, wherein said shaft has a channel for the removal of waste material by suction.

11. A boring tool according to claim 10, characterized by a tube serving as said suction channel, which is located at the bottom of said groove.

12. A boring tool according to any one of the claims 1 to 5, 8 or 9, wherein said boring tool consists of a rear part and a front part being connected to each other, said rear part having said shank and said front part forming said shaft having said groove for said tiltable tool said rear and said front part further comprising communicating channels for the removal of waste material by suction.

13. A tool suitable for mounting into an elongated groove extending along a portion of the shaft of a boring tool for boring an enlarged portion within a bore hole, said tool being in the shape of an elongated plate having a first longitudinal edge, two broad sides, two ends and a cutting edge at least at one of said ends beside said first longitudinal edge, said elongated plate having a centerline extending over its entire length and being shaped in such a fashion, that said centerline curves in a concave fashion at least at the end opposite to said cutting edge, when viewed from said first longitudinal edge.

14. A tool according to claim 13, wherein said elongated plate has a second longitudinal edge which is curved in a convex fashion.

15. A tool according to claim 13 wherein said elongated plate has a central transverse axis parallel to said broad sides, said plate being axial-symmetrical relative to said central transversal axis and having cutting edges at each end of said plate.

16. A tool according to any one of the claims 13 to 15, wherein said elongated plate has short end faces intersecting said first longitudinal edge, at least one of said end faces being curved in a convex manner so that at least one of its points is at a maximum distance from the other of said short end faces, said cutting edge being formed by a cutting tool connected to said elongated plate adjacent to said at least one curved end face, so that it is spaced from said maximum distance point of said at least one curved end face.

* * * * *